(12) United States Patent
Ikeda

(10) Patent No.: US 8,692,898 B2
(45) Date of Patent: Apr. 8, 2014

(54) IMAGE CAPTURE APPARATUS FOR ENCRYPTING IMAGE DATA USING A FIRST ENCRYPTION METHOD OR A SECOND ENCRYPTION METHOD BASED ON AN INSTRUCTION

(75) Inventor: Yasuyuki Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 13/155,814

(22) Filed: Jun. 8, 2011

(65) Prior Publication Data

US 2012/0013756 A1   Jan. 19, 2012

(30) Foreign Application Priority Data

Jul. 16, 2010   (JP) ................................. 2010-162099

(51) Int. Cl.
*H04N 5/225*   (2006.01)
(52) U.S. Cl.
USPC ...................................................... 348/220.1
(58) Field of Classification Search
None
See application file for complete search history.

(56) References Cited

U.S. PATENT DOCUMENTS

| 2005/0041144 A1* | 2/2005 | Mitchell et al. ............... 348/376 |
| 2005/0046707 A1* | 3/2005 | Takane ........................ 348/231.3 |
| 2007/0103561 A1* | 5/2007 | Kunieda ...................... 348/220.1 |

FOREIGN PATENT DOCUMENTS

| JP | 2003-219341 A | 7/2003 |
| JP | 2008-109590 A | 5/2008 |

* cited by examiner

*Primary Examiner* — Albert Cutler
(74) *Attorney, Agent, or Firm* — Canon USA, Inc. IP Division

(57) ABSTRACT

An image apparatus includes an image capture unit that captures a moving image and generates moving image data corresponding to the moving image, a generating unit that generates predetermined image data which is embedded in the moving image data based on still image data corresponding to the still image; and an encryption unit that encrypts the predetermined image data and the still image data if the image capture unit is instructed to capture the still image during capturing of the moving image.

12 Claims, 5 Drawing Sheets

| | | RECORDING SIZE OF MOVING IMAGE DATA | | |
|---|---|---|---|---|
| | | FULL HD (2 MILLION PIXELS) | HD (1 MILLION PIXELS) | VGA (300,000 PIXELS) |
| RECORDING SIZE OF STILL IMAGE DATA | L (10 MILLION PIXELS) | ENCRYPTION ON | ENCRYPTION ON | ENCRYPTION OFF |
| | M (2.5 MILLION PIXELS) | ENCRYPTION ON | ENCRYPTION ON | ENCRYPTION OFF |
| | S (1.2 MILLION PIXELS) | ENCRYPTION ON | ENCRYPTION ON | ENCRYPTION ON |

FIG.4

| | | RECORDING SIZE OF MOVING IMAGE DATA | | |
|---|---|---|---|---|
| | | FULL HD (2 MILLION PIXELS) | HD (1 MILLION PIXELS) | VGA (300,000 PIXELS) |
| RECORDING SIZE OF STILL IMAGE DATA | L (10 MILLION PIXELS) | ENCRYPTION ON | ENCRYPTION ON | ENCRYPTION OFF |
| | M (2.5 MILLION PIXELS) | ENCRYPTION ON | ENCRYPTION ON | ENCRYPTION OFF |
| | S (1.2 MILLION PIXELS) | ENCRYPTION ON | ENCRYPTION ON | ENCRYPTION ON |

IMAGE CAPTURE APPARATUS FOR ENCRYPTING IMAGE DATA USING A FIRST ENCRYPTION METHOD OR A SECOND ENCRYPTION METHOD BASED ON AN INSTRUCTION

BACKGROUND OF THE INVENTION

1. Field of the Invention

The present invention relates to an image capture apparatus, a computer-readable recording medium and a control method.

2. Description of the Related Art

In recent years, a digital still camera (hereinafter simply referred to as a "digital camera") capable of capturing a moving image of a small recording size and a high quality still image of a large recording size has been widely used.

If an instruction for capturing a still image is input while capturing a moving image, the digital camera like this first stops the recording of the moving image. Then, the digital camera changes an image sensor drive method from a moving image-recording drive method to a still image-capturing drive method. Accordingly, the digital camera can shoot a still image in this state.

In this case, the recording of the moving image being recorded while capturing the moving image is suspended when the capturing of the still image is started. If the recording of the moving image is resumed after the still image capture operation has ended, the captured still image and the recorded moving image are recorded in different files because they have different recording sizes. Accordingly, the moving frame is not partially captured during a time period in which the still image is being captured. Therefore, if the recorded moving image is to be reproduced, the moving image may break when it is viewed halfway. In this case, the user may feel uncomfortable.

Japanese Patent Application Laid-Open No. 2003-219341 discusses a digital camera that interpolates a lost portion of a moving image frame by filling, into the moving image, data generated by converting the recording size of a still image captured while the moving image is captured into the same recording size as the recording size of the moving image.

Japanese Patent Application Laid-Open No. 2008-109590 discusses a digital camera having an encryption function to maintain the security of a still image having a high image quality captured by a digital camera.

However, if a high quality still image is captured when the moving image is currently captured, a digital camera having the encryption function does not encrypt the still image captured while capturing the moving image.

Accordingly, the security of a still image captured while a moving image is being captured cannot be secured.

SUMMARY OF THE INVENTION

The present invention is directed to overcoming the above-described drawbacks and disadvantages.

According to an aspect of the present invention, an image capture apparatus includes an image capture unit that captures a moving image and generates moving image data corresponding to the moving image, an instruction unit that instructs the image capture unit to capture a still image, a control unit that controls the image capture unit to stop capturing of the moving image and to capture the still image, if the image capture unit is instructed to capture the still image during capturing of the moving image, a generating unit that generates predetermined image data which is embedded in the moving image data based on still image data corresponding to the still image, and an encryption unit that encrypts the predetermined image data and the still image data if the image capture unit is instructed to capture the still image during capturing of the moving image.

According to another aspect of the present invention, a non-transitory computer-readable recording medium storing a program to be executed by a computer, wherein the program for using the computer to perform a method for controlling an image capture apparatus which includes an image capture unit that captures a moving image and generates moving image data corresponding to the moving image, and an instruction unit that instructs the image capture unit to capture a still image, the method comprising: controlling the image capture unit to stop capturing of the moving image and to capture the still image, if the image capture unit is instructed to capture the still image during capturing of the moving image, generating predetermined image data which is embedded in the moving image data based on still image data corresponding to the still image, and encrypting the predetermined image data and the still image data, if the image capture unit is instructed to capture the still image during capturing of the moving image.

According to another aspect of the present invention, a control method for controlling an image capture apparatus which includes an image capture unit that captures a moving image and generates moving image data corresponding to the moving image, and an instruction unit that instructs the image capture unit to capture a still image, the control method includes controlling the image capture unit to stop capturing of the moving image and to capture the still image, if the image capture unit is instructed to capture the still image during capturing of the moving image, generating predetermined image data which is embedded in the moving image data based on still image data corresponding to the still image, and encrypting the predetermined image data and the still image data if the image capture unit is instructed to capture the still image during capturing of the moving image.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to describe the principles of the present invention.

FIG. 4 illustrates an example of a condition for changing whether to encrypt image data captured by the image capture apparatus 100 according to the third exemplary embodiment of the present invention.

DETAILED DESCRIPTION OF THE EMBODIMENTS

Various exemplary embodiments, features, and aspects of the present invention will now be described in detail below with reference to the attached drawings.

The following exemplary embodiments of the present invention described below with reference to each corresponding drawings are mere examples and do not limit the scope of the present invention to the embodiments described below.

Figure 1:
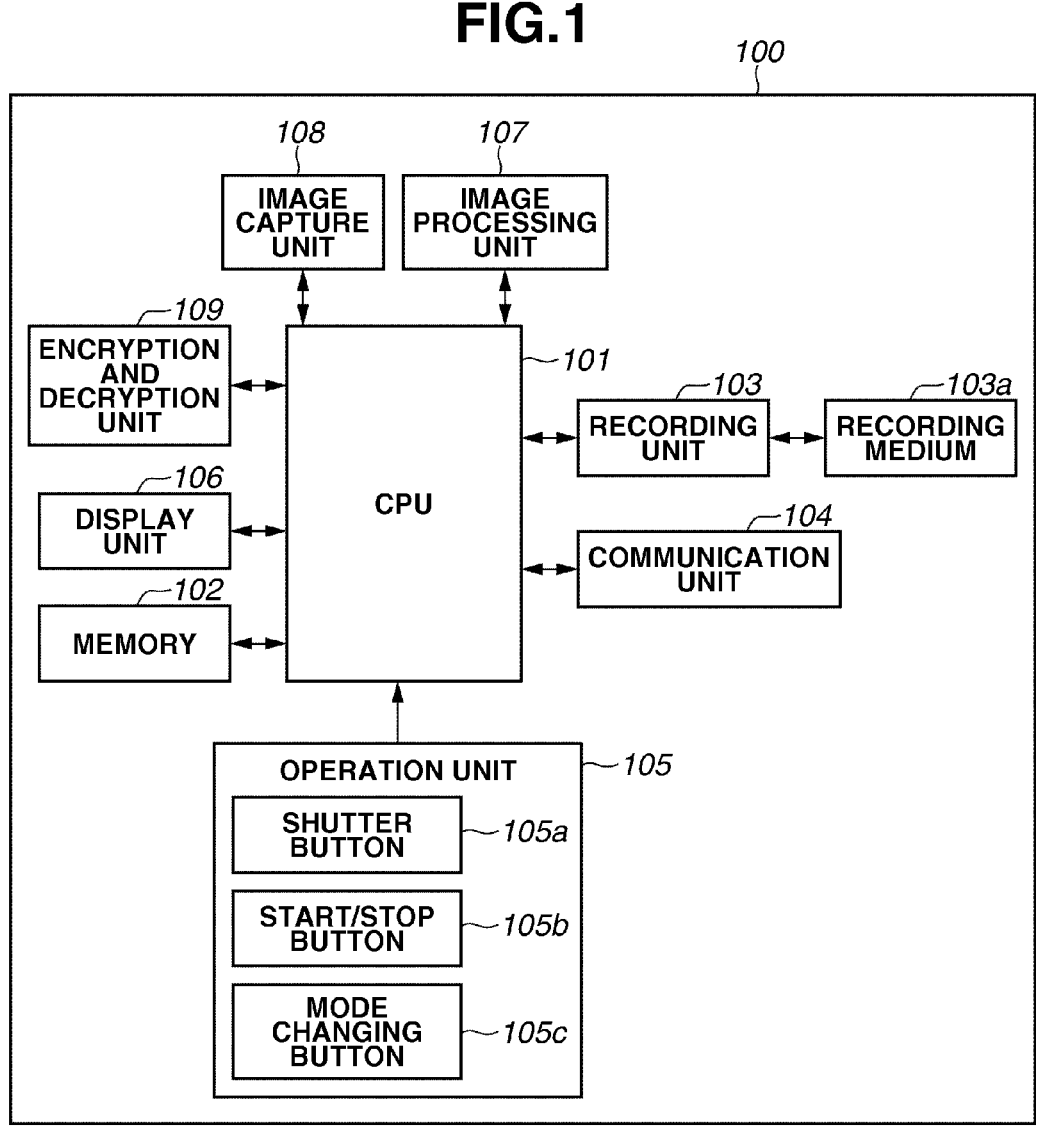
FIG. 1 is a block diagram illustrating an example of configuration of an image capture apparatus 100 according to first through third exemplary embodiments of the present invention.

FIG. 1 is a block diagram illustrating an example of a configuration of an image capture apparatus 100 according to a first exemplary embodiment. In the present exemplary embodiment, a digital single-lens reflex camera (hereinafter simply referred to as a camera) will be described in detail as an example of the image capture apparatus 100. The present invention can also be applied to an image capture apparatus different from the image capture apparatus 100, such as a video camera, a digital still camera, or a mobile telephone having a camera function.

<The Camera 100>

Referring to FIG. 1, the camera 100 includes a central processing unit (CPU) 101, a memory 102, a recording unit 103, a communication unit 104, an operation unit 105, a display unit 106, an image processing unit 107, an image capture unit 108, and an encryption and decryption unit 109.

The camera 100 includes an operation mode, such as an image capture mode or a reproduction mode. If the operation mode of the camera 100 is set to the image capture mode, the camera 100 can capture an image of an object. In addition, in the image capture mode, the camera 100 can record video data, such as moving image data or still image data, on a recording medium 103a. On the other hand, when the operation mode of the camera 100 is set to the reproduction mode, the camera 100 can reproduce video data selected by a user from the recording medium 103a.

The CPU 101 controls the operation of the entire image capture apparatus 100 according to a computer program stored on the memory 102. A work area of the CPU 101 is not limited to the memory 102. More specifically, a removable storage device, such as a hard disk drive (HDD), can be used.

The memory 102 functions as a work area of the CPU 101. The memory 102 is a memory that stores values of various constants or variables, data, and information used by the CPU 101. More specifically, the memory 102 stores various information, such as a computer program for controlling the camera 100 and predetermined video data and an icon to be displayed on the display unit 106.

In addition, when the camera 100 is currently executing a live view image capture operation or when the camera 100 is currently recording moving image data, the memory 102 is used as a frame buffer for the video data serially written and stored at a predetermined frame rate.

If the operation mode of the camera 100 is in the image capture mode, the recording unit 103 can record video data generated by the image processing unit 107 and the image capture unit 108 according to an instruction input by the CPU 101 on the recording medium 103a. The recording of the video data generated by the image capture unit 108 on the recording medium 103a is controlled by the CPU 101 according to a signal of an operation input by the user via the operation unit 105.

On the other hand, if the operation mode of the camera 100 is set to the reproduction mode, the recording unit 103 can reproduce video data selected by the user from the recording medium 103a. The selection of the video data reproduced from the recording medium 103a is controlled by the CPU 101 according to a signal of an operation input by the user via the operation unit 105.

The video data to be reproduced by the recording unit 103 from the recording medium 103a is supplied from the recording unit 103 to the communication unit 104 and the display unit 106. The video data supplied to the display unit 106 from the recording unit 103 is displayed on the display unit 106.

In the present exemplary embodiment, the recording medium 103a is a memory card or an HDD. More specifically, the recording medium 103a can be built in the camera 100. However, alternatively, the recording medium 103a can be a recording medium detachably mounted to the camera 100. In addition, for the recording medium 103a, a memory card, such as a Personal Computer Memory Card International Association (PCMCIA) card or a Compact Flash (CF)® card, or a hard disk can be used. In addition, the recording medium 103a can be constituted by a micro digital audio tape (DAT), a magnetooptic disc (MO), an optical disc, such as a compact disc (CD)-recordable (CD-R) or a CD-rewritable (CD-RW), or a phase-change optical disc, such as a digital versatile disc (DVD).

The communication unit 104 includes a connection terminal for connecting an interface thereto, such as a universal serial bus (USB) cable, a high definition multimedia interface (HDMI) cable, or Institute of Electrical and Electronic Engineers (IEEE) 1394. Video data and auxiliary data can be transmitted to an external apparatus connected via the above-described interface. The auxiliary data includes a message that indicates the operation status of the image capture apparatus 100 expressed in a text, an image, or sound, a control command for controlling the external apparatus, and management information about the camera 100.

If the operation mode of the camera 100 is set to the image capture mode, the image capture unit 108 captures an image of an object and generates video data based on an optical image of the object. The video data generated by the image capture unit 108 is supplied to the communication unit 104, the image processing unit 107, and the display unit 106. The communication unit 104 transmits the video data generated by the image processing unit 107 and the auxiliary data generated by the CPU 101 to an external apparatus.

The operation unit 105 is the user interface via which the user can operate the camera 100. The operation unit 105 includes a plurality of buttons, which can be operated by the user to operate the camera 100. A user instruction is input to the CPU 101 via the operation unit 105. When the user operates the operation unit 105, a signal corresponding to the user operation via the operation unit 105 is input to the CPU 101.

The buttons in the operation unit 105 include a switch, a dial, a touch panel, and a pointing device. In addition, the operation unit 105 includes various setting buttons, such as a shutter button 105a, a start/stop button 105b, and a mode changing button 105c.

The shutter button 105a can be pressed by two states including a state S1 and a state S2. In the state S1, the shutter button 105a is half-pressed. On the other hand, in the state S2, the shutter button 105a is fully pressed. When the operation mode of the camera 100 is set to the image capture mode, if the shutter button 105a is half-pressed by the user and the shutter button 105a is in the state S1, a signal including an instruction for process, such as autofocus (AF) process and auto exposure (AE) process, is input by the operation unit 105 to the CPU 101. In this case, the CPU 101 instructs the image processing unit 107 and the image capture unit 108 to start the AF process and the AE process.

When the operation mode of the camera 100 is set to the image capture mode, if the shutter button 105a is fully pressed by the user to be in the state S2 after the image processing unit 107 and the image capture unit 108 have executed the AF process and the AE process, the operation unit 105 inputs a signal that instructs shooting process to the CPU 101. The CPU 101 instructs the image processing unit 107 and the image capture unit 108 to start the image capture process, such as exposure process, development process, and the recording process.

The start/stop button 105b is a button for inputting an instruction for starting or stopping the recording of the moving image to the camera 100. When the start/stop button 105b is pressed, the operation unit 105 inputs a signal, to the CPU 101, for instructing the start or the stop of the recording of the moving image data, which has been generated by the image processing unit 107 and the image capture unit 108, onto the recording medium 103a. After receiving the signal from the operation unit 105, the CPU 101 instructs the image processing unit 107 and the image capture unit 108 to start or stop the generation of the moving image data or to start or stop the recording of the moving image data onto the recording medium 103a.

When the moving image data is currently recorded by the user by operating the start/stop button 105b, the user can operate the camera 100 to capture still image data during the capturing of moving image data by using the shutter button 105a. The button for starting or stopping the recording of moving image data is not limited to the start/stop button 105b.

The mode changing button 105c is a button for inputting an instruction to the CPU 101 for changing the operation mode of the camera 100 to either the image capture mode or the reproduction mode. The image capture mode is a mode for generating moving image data or still image data as one frame of moving image data by using the image processing unit 107 and the image capture unit 108.

If the shutter button 105a is fully pressed to be in the state S2 when the operation mode of the camera 100 is set to the image capture mode, still image data is generated by the image processing unit 107 and the image capture unit 108. On the other hand, if the start/stop button 105b is pressed when the operation mode of the camera 100 is set to the image capture mode, moving image data is generated by the image processing unit 107 and the image capture unit 108.

A continuous image capture mode, an automatic image capture mode, a shutter speed priority image capture mode, an aperture priority image capture mode, and a manual image capture mode are included in the image capture mode.

The shutter button 105a can have a double function for inputting an instruction for capturing still image data and for starting or stopping the recording of moving image data.

A menu button is a button for inputting an instruction to the CPU 101 for displaying or closing a menu screen for a camera control screen and a menu screen for a camera setting screen. The camera control screen is a screen for controlling the camera 100 and is stored on the memory 102. The camera setting screen is a screen for changing a setting for the camera 100. By executing an operation via the above-described menu screens, the user can execute a setting for live view image capture and a setting as to whether to encrypt the video data captured by the camera 100.

The user can press the menu button to display the menu screen on the display unit 106. Furthermore, the user can select an item for the live view image capture or an item for enabling or disabling encryption on the video data via the menu screen by operating a cross button. In this manner, the user can enable or disable the live view image capture or the encryption on the video data.

If the user has set the live view image capture setting to be "ON", the CPU 101 sets a live view setting flag on the memory 102 to an ON state. The live view setting flag indicates whether the live view image capture is enabled or disabled. On the other hand, if the live view image capture setting is set to "OFF", the CPU 101 sets the live view setting flag, which is stored on the memory 102, to an OFF state.

Similarly, if the video data encryption setting is set to "ON" by the user, the CPU 101 sets an encryption setting flag stored on the memory 102 to an ON state. The encryption setting flag indicates whether the encryption is enabled or disabled. On the other hand, if the video data encryption setting is set to "OFF" by the user, the CPU 101 sets the encryption setting flag to an OFF state.

The image processing unit 107 executes image process, such as pixel interpolation process or color conversion process, on the video data output from the image capture unit 108, the video data read from a frame buffer, which is included on the memory 102, or the video data read from the recording medium 103a. The image processing unit 107 includes a compression/decompression circuit configured to compress the video data and decompress the compressed data by a publicly known compression method by using adaptive discrete cosine transformation (ADCT).

The video data can be compressed by various compression methods, such as Joint Photographic Experts Group (JPEG) method, Moving Picture Experts Group (MPEG) method, RAW method, Motion JPEG method, or H.264 method. The video data read from the frame buffer of the memory 102 is compressed or decompressed by the compression/decompression circuit. Subsequently, the image processing unit 107 outputs the compressed or decompressed data to the recording unit 103.

In addition, the image processing unit 107 executes calculation by using the video data output from the image capture unit 108. Based on a result of the calculation, the CPU 101 controls through-the-lens (TTL) type AF process and AE process, preflash process, and TTL type auto white balance process.

The image capture unit 108 includes connection terminals, which can function as an interface with a lens unit (not illustrated). The lens unit includes an imaging lens unit, such as a variator lens or a focusing lens, a diaphragm, and a drive circuit for driving the lens unit and the diaphragm. The image capture unit 108 includes a focal plane shutter, an optical system, an image sensor, a mirror unit, an analog-to-digital (A/D) converter, and a timing generation circuit.

The image sensor converts an optical image of an object, which has been incident to the image sensor via the lens unit (not illustrated) connected to the connection terminals of the image capture unit 108, into an image signal (electric signal). For the image sensor, a charge-coupled device (CCD) image sensor or a complementary metal oxide semiconductor (CMOS) image sensor can be used. The mirror unit moves to a position for guiding the optical image of the object that has been incident to the mirror unit via the lens unit to the image sensor or to an optical viewfinder (not illustrated).

The A/D converter converts an image signal output from the image sensor (analog data) into digital data (video data). In addition, the A/D converter outputs the converted video data to the communication unit 104 or the image processing unit 107. The timing generation circuit supplies a clock signal and a control signal to each component of the image capture unit 108.

When the shutter button 105a is in the state S1, the CPU 101 controls the image processing unit 107 and the image capture unit 108 to execute process, such as the AF process or the AE process. In this case, the image processing unit 107 and the image capture unit 108 can execute preflash (electronic flash (EF)) process and auto white balance (AWB) process.

When the shutter button 105a is in the state S2, the CPU 101 controls the image processing unit 107 and the image capture unit 108 to execute image capture process, which includes exposure process and development process. The analog data output from the image sensor is converted by the A/D converter into digital data. Then the converted data is written onto the frame buffer of the memory 102 as video data. Subsequently, the video data is subjected to development processing according to image capture parameters that have been recorded on the memory 102. The video data that has been developed and compressed by the image capture unit 108 and the image processing unit 107 is written on the recording medium 103a as still image data.

The encryption and decryption unit 109 encrypts the video data by using an existing encryption method if the video data encryption setting is set "ON" via the menu screen. In addition, in reproducing the encrypted data when the camera 100 is in the reproduction mode, the encryption and decryption unit 109 decodes the encrypted video data.

<The Moving Image Recording In-Process Still Image Capture Process>

Figure 2:
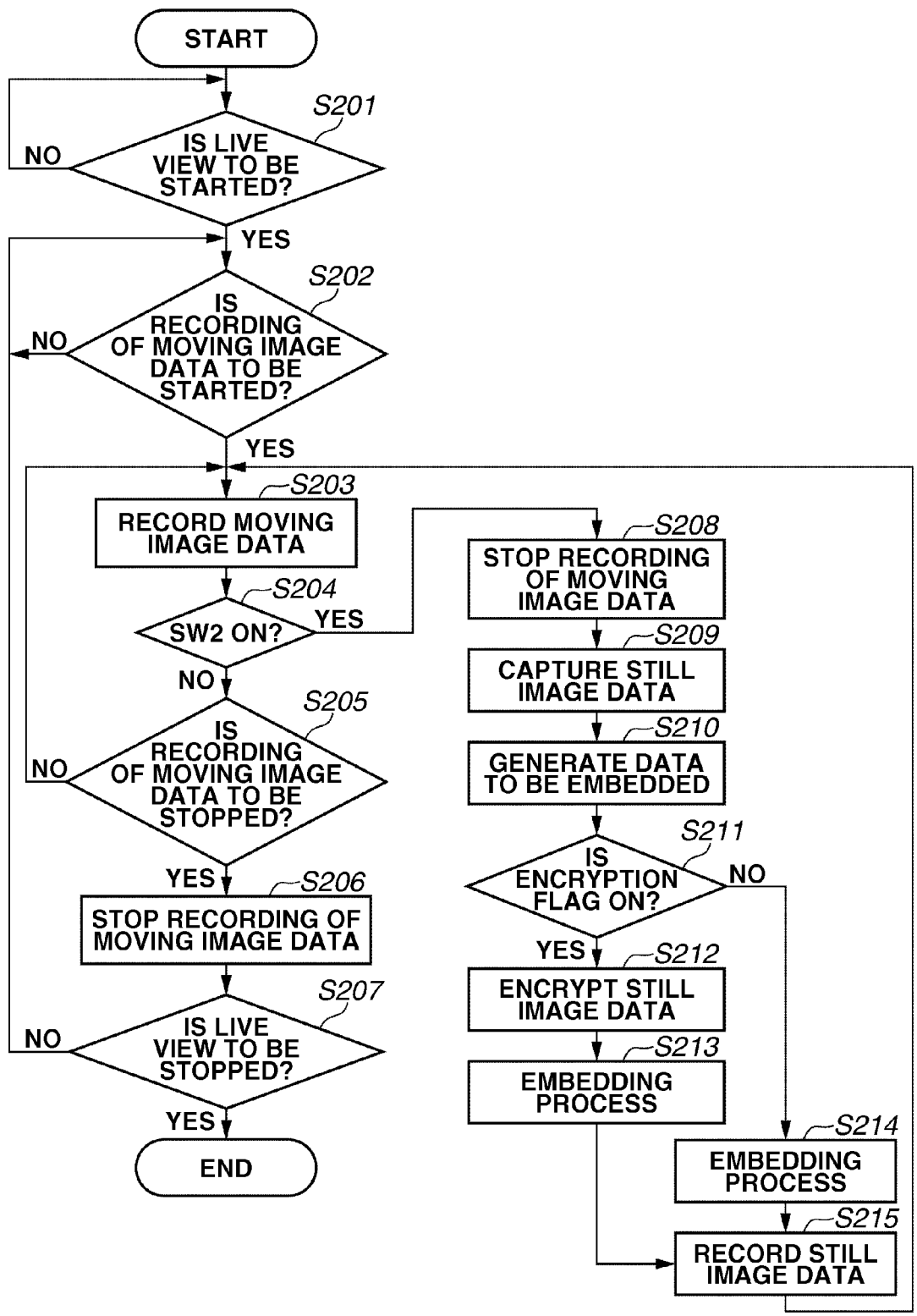
FIG. 2 is a flow chart illustrating an example of a moving image recording in-process still image capture process, which is executed by the image capture apparatus 100 according to the first exemplary embodiment of the present invention.

FIG. 2 is a flow chart illustrating moving image recording in-process still image capture process, which is executed by the image capture apparatus 100 according to the present exemplary embodiment. The moving image recording in-process still image capture process is process executed by the camera 100 when the user executes an operation for capturing a still image by the camera 100 while the camera 100 is currently recording a moving image.

The moving image recording in-process still image capture process executed by the camera 100 according to the present exemplary embodiment will be described in detail below with reference to FIGS. 1 and 2. The moving image recording in-process still image capture process is executed if the live view image capture and the video data encryption are set "ON" when the camera 100 is powered on in the image capture mode.

The camera 100 executes the process in the flow chart of FIG. 2 under control of the CPU 101 or an operating system (OS), which is operating on a computer (CPU or micro processing unit (MPU)), by executing a computer program read from the memory 102.

Referring to FIG. 2, in step S201, the CPU 101 determines whether the live view setting flag, which is stored on the memory 102, is set "ON". If it is determined that the live view setting flag on the memory 102 is set ON (Yes in step S201), then the CPU 101 determines that the live view function is enabled. On the other hand, if the live view setting flag is set OFF, the CPU 101 determines that the live view function is disabled.

If it is determined that the live view setting flag on the memory 102 is set ON (Yes in step S201), then the process proceeds from step S201 to step S202. If the live view function is enabled, the CPU 101 executes control for moving the mirror unit to move to the position at which the optical image of the object is guided to the image sensor (i.e., the CPU 101 controls the mirror unit to execute a "mirror-up" operation).

In this case, the CPU 101 controls the image processing unit 107 and the image capture unit 108 to execute the AF process and the AE process to generate digital data based on the object light that has been guided to the image sensor. Then, the digital data is subjected to predetermined pixel interpolation process and color conversion process by the image processing unit 107. After that, the processed data is stored on the frame buffer of the memory 102 as video data.

On the other hand, if it is determined that the live view function is disabled (No in step S201), then the process returns to step S201 and the CPU 101 executes control for repeating the process in step S201.

In step S202, the CPU 101 determines whether a moving image recording signal, which instructs the start of recording of moving image data, is input by the user by operating the start/stop button 105b of the operation unit 105. If the moving image recording signal is input (Yes in step S202), then the CPU 101 sets the recording size of the moving image data to be recorded and the frame rate of the recording. In addition, in this case, the CPU 101 controls the image capture unit 108 to record the moving image data. In this case, the process proceeds from step S202 to step S203.

On the other hand, if the moving image recording signal is not input (No in step S202), then the process repeats the process in step S202.

In step S203, the CPU 101 starts to record the moving image data. More specifically, the CPU 101 encodes the video data stored on the frame buffer of the memory 102 by using the predetermined coding method. The encoded video data is processed into moving image data having a predetermined file format, and the moving image data is transferred from the frame buffer of the memory 102 to the recording medium 103a to be recorded thereon as a moving image file including the moving image data. The moving image file includes record information and display information as well as the moving image data. The recording information includes the image capture date and time of the moving image data and the recording size of the moving image data. The display information includes information for displaying the moving image data.

Until a moving image recording stop signal, which instructs the cancellation of the start of recording moving image data, is input, the CPU 101 continues the process for encoding the video data, generating moving image data based on the coded video data, and recording the generated moving image data on the recording medium 103a.

If the CPU 101 has started recording the moving image data in step S203 and if the user has fully pressed the shutter button 105a during capturing of the moving image data down to the state S2, an instruction for capturing still image data may be input via the operation unit 105. Accordingly, in step S204, the CPU 101 determines whether an image capture instruction signal for starting image capture is input by the operation unit 105.

If the image capture instruction signal is input (Yes in step S204), then the process proceeds from step S204 to step S208. On the other hand, if no image capture instruction signal is input (No in step S204), then the process proceeds from step S204 to step S205.

In step S205, the CPU 101 determines whether a moving image recording stop signal is input via the start/stop button 105b of the operation unit 105. If it is determined that a moving image recording stop signal is input (Yes in step S205), then the process proceeds from step S205 to step S206.

If no moving image recording stop signal is input (No in step S205), then the process returns to step S203 from step S205.

In step S206, the CPU 101 stops the recording of the moving image data. More specifically, in step S206, the CPU 101 controls the image processing unit 107, the image capture unit 108, and the recording unit 103 to stop the recording of the moving image data. In this case, under control of the CPU 101, the image processing unit 107 stops the encoding of the video data, and the recording unit 103 stops the recording of the moving image data from the frame buffer of the memory 102 onto the recording medium 103a.

If the video data encoded by the image processing unit 107 has not been recorded on the recording medium 103a yet, the coded video data is stored on the frame buffer of the memory 102.

In step S207, the CPU 101 determines whether a live view image capture stop signal, which is a signal for stopping the live view image capture, is input via the operation unit 105. If it is determined that a live view image capture stop signal is input (Yes in step S207), then the CPU 101 controls the image processing unit 107 and the image capture unit 108 to stop the live view image capture.

After controlling the image processing unit 107 and the image capture unit 108, the CPU 101 controls the mirror unit to move to a position for guiding the optical image of the object that has been incident to the mirror unit via the optical system to the optical viewfinder (not illustrated) (i.e., the mirror unit is controlled to perform a mirror-down operation). Then the process ends.

On the other hand, if no live view capture stop signal is input (No in step S207), then the process returns to step S202 from step S207.

If the capture instruction signal is input (Yes in step S204), in order to capture still image data, the CPU 101 needs to execute control for stop the recording of the moving image data, which has been executed in step S203.

Therefore, in step S208, the CPU 101 stops the recording of the moving image data like performed in step S206. After stopping the recording of the moving image data, the CPU 101 controls the image capture unit 108 to capture still image data according to an image capture parameter recorded on the memory 102.

In step S209, the CPU 101 controls the image capture unit 108 to execute image capture process. The image capture unit 108 captures still image data corresponding to one frame of the video data. In addition, the image capture unit 108 stores the captured still image data on the frame buffer of the memory 102. Furthermore, the image processing unit 107 executes the above-described process on the captured still image data. In addition, the recording unit 103 generates an independent still image file including the still image data and temporarily records the file on the frame buffer.

Similar to the moving image file described above, the still image file, in addition to the still image data, includes image capture information and display information. The image capture information includes the image capture date and time and the recording size of the still image data. The display information includes information for displaying the still image data. If the image capture unit 108 has executed the image capture, the process proceeds from step S209 to step S210.

In step S210, the CPU 101 generates embedding data by converting the still image data, which has been generated and recorded on the frame buffer in step S209, into data of the same size as the recording size of the moving image data that has been recorded on the recording medium 103a in step S203. Then the process proceeds from step S210 to step S211.

In step S211, the CPU 101 determines whether the video data encryption setting flag in the camera 100 is set "ON" by referring to the encryption setting flag stored on the memory 102. If the encryption setting flag on the memory 102 is set "ON" (Yes in step S211), the CPU 101 determines that the encryption function is enabled. Then the process proceeds from step S211 to step S212.

On the other hand, if the encryption setting flag on the memory 102 is set OFF (No in step S211), then the CPU 101 determines that the encryption function is disabled. Then, the process proceeds from step S211 to step S214.

In step S212, the CPU 101 controls the encryption and decryption unit 109 to encrypt the still image data included in the still image file, which has been captured and stored in the frame buffer in step S209.

The encryption and decryption unit 109 encrypts the still image data by an existing encryption method, such as Data Encryption Standard (DES) or Advanced Encryption Standard (AES). In addition, the Fast Data Encipherment Algorithm (FEAL), Rivest Cipher (RC) 2, or RC4 can be used as the encryption method.

In step S213, the CPU 101 executes embedding process. More specifically, in step S213, the CPU 101 executes control for embedding the embedding data that has been generated in step S210 into the moving image data of the moving image file that has been recorded on the recording medium 103a in step S203. The embedding process is process for embedding the embedding data generated in step S 210 instead of the frame of the moving image data not captured and lost during the suspension of the recording of the moving image data, which has occurred due to the start of capturing the still image data in step S209.

The moving image data to which the embedding data has been embedded is temporarily recorded on the frame buffer of the memory 102. For the number of frames to which the embedding data is to be embedded, the embedding data can be embedded into only one frame. Alternatively, the embedding data can be embedded into frames of the number of frames corresponding to the portion of the moving image data for the actual time required for capturing the still image data. Further, alternatively, the embedding data can be embedded into frames of a predetermined number of frames.

In step S214, the CPU 101 executes the process similar to the process in step S213. The moving image data to which the embedding data has been embedded is temporarily recorded on the frame buffer of the memory 102.

In step S215, the CPU 101 executes control for recording the still image data that has been generated and recorded on the frame buffer in step S209 on the recording medium 103a. If the encryption function is enabled (Yes in step S211), then the CPU 101 executes control for recording a still image file including the still image data that has been encrypted in step S212 on the recording medium 103a.

On the other hand, if the encryption function is disabled (No in step S211), the CPU 101 executes control for recording a still image file including the still image data generated in the step S209 on the recording medium 103a. The still image file and the moving image file are recorded on the recording medium 103a separately from each other.

After the still image data is completely recorded on the recording medium 103a, the process returns from step S215 to step S203, and the CPU 101 starts the recording of the moving image data that has been stopped in the step S208 again.

At this stage of the process, the CPU 101 records the moving image data including the embedding data, which has been temporarily recorded on the frame buffer of the memory 102 in step S213 or S214, from the frame buffer onto the recording medium 103a.

When the recording of the moving image data is started, the CPU 101 controls the image processing unit 107, the image capture unit 108, and the recording unit 103 to set again the recording size of the moving image data to be recorded and the frame rate of the recording used for the recording of the moving image data.

In the camera 100 according to the present exemplary embodiment having the above-described configuration, if capturing of still image data is started while capturing moving image data, outsiders cannot know what still image data has been captured because the captured high-resolution still image data is encrypted.

In addition, in the present exemplary embodiment, if the capturing of the moving image data is stopped to capture still image data, the CPU 101 executes control for embedding the embedding data generated based on the still image data that has been captured during the time corresponding to the frame of the moving image data that has not been captured due to the suspension of the image capture. Accordingly, the camera 100 according to the present exemplary embodiment can interpolate the lost moving image data.

With the above-described configuration, the present exemplary embodiment can increase the security of high-resolution still image data that is captured during capturing of moving image data.

In addition, in the process in the flow chart of FIG. 2, the CPU 101 generates embedding data in step S210, and embeds the embedding data into the moving image data included in the moving image file in step S213. However, the moving image recording in-process still image capture process executed by the camera 100 according to the present exemplary embodiment is not limited to this. More specifically, alternatively, the CPU 101 can generate embedding data based on video data including a black image or a blue image instead of generating the embedding data based on the still image data captured in step S209 and embed the embedding data into the moving image data.

Figure 3:
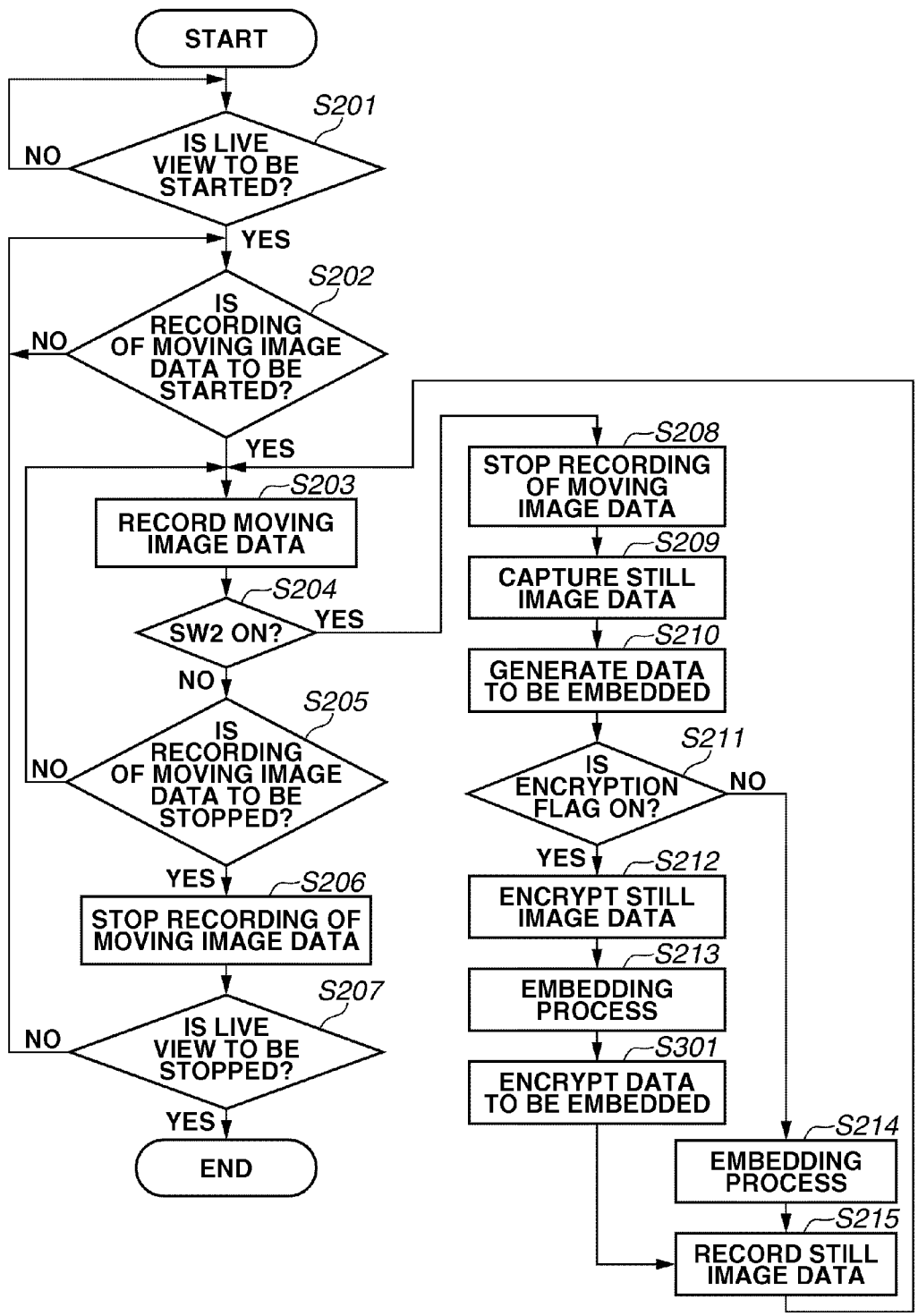
FIG. 3 is a flow chart illustrating an example of a moving image recording in-process still image capture process, which is executed by the image capture apparatus 100 according to the second exemplary embodiment of the present invention.

A second exemplary embodiment of the present invention will be described in detail below with reference to the flow chart of FIG. 3. FIG. 3 is a flow chart illustrating exemplary moving image recording in-process still image capture process, which is executed by the image capture apparatus 100 according to the present exemplary embodiment. In the present exemplary embodiment, units, components, and configurations similar to those of the first exemplary embodiment described above will not be described in detail and different points from the first exemplary embodiment only will be described in detail.

Exemplary moving image recording in-process still image capture process executed by the camera 100 according to the present exemplary embodiment will be described in detail below with reference to the flow chart of FIG. 3.

The moving image recording in-process still image capture process illustrated in FIG. 3 is executed if the camera 100 is in the image capture mode and the live view image capture and the video data encryption are set "ON" when the camera 100 is powered on. The camera 100 executes the process in the flow chart of FIG. 3 under control of the CPU 101 or an OS, which is operating on a computer (CPU or MPU), by executing a computer program read from the memory 102.

Referring to FIG. 3, after the CPU 101 has executed the embedding process for embedding the embedding data into the moving image data included in the moving image file in step S213, then the process proceeds from step S213 to step S301.

In step S301, the CPU 101 controls the encryption and decryption unit 109 to encrypt the embedding data that is embedded in the moving image data included in the moving image file, which has been temporarily stored on the frame buffer of the memory 102 in step S213.

If the embedding data is embedded in the moving image data in one frame thereof, the encryption and decryption unit 109 encrypts the embedding data by using the moving image coding method, such as Motion JPEG. On the other hand, if the embedding data is embedded in the moving image data in a plurality of frames in the number of frames corresponding to the portion of the moving image data for the time required for capturing the still image data, the encryption and decryption unit 109 encrypts the embedding data by the moving image coding method such as MPEG4.

Furthermore, if the embedding data is embedded in the moving image data in the frames in the predetermined number of frames, the encryption and decryption unit 109 also encrypts the embedding data by the moving image coding method such as MPEG4.

After the embedding data, which is embedded in the moving image data temporarily stored on the frame buffer of the memory 102 in step S213, is embedded under control of the CPU 101, the process proceeds from step S301 to step S215.

The embedding data encrypted in step S301 is recorded on the recording medium 103a together with the moving image data from the frame buffer of the memory 102. In addition, the encrypted embedding data can be recorded as header information for the moving image file including the moving image data. Alternatively, the encrypted embedding data can be recorded as another file of the moving image file. In this case, in reproducing the moving image data, the CPU 101 executes control for reproducing the embedding data decoded by the encryption and decryption unit 109 together with the moving image data.

In the camera 100 according to the present exemplary embodiment, if a still image is captured while capturing a moving image, the embedding data, which has been generated based on still image data and which is embedded into the moving image data, is encrypted as well as the still image data to be recorded. Accordingly, outsiders cannot know what still image data has been shot while capturing the moving image.

As a result, the still image data captured during the capturing of the moving image data cannot be extracted. Furthermore, the frame interpolated by the captured still image data cannot be extracted from the moving image file. Accordingly, the data security can be enhanced.

In the present exemplary embodiment, the embedding data is embedded in the moving image data before being encrypted. Furthermore, the encryption is executed on the moving image data including the embedding data. However, the present invention is not limited to this. The portion of the moving image data for a predetermined time period before embedding the embedding data, can be encrypted together with the embedding data.

The portion of the moving image data for a predetermined time period after embedding the embedding data, can be encrypted together with the embedding data. Alternatively, the portion of the moving image data for a predetermined time period before embedding the embedding data and the portion of the moving image data for a predetermined time period after embedding the embedding data, can be encrypted together with the embedding data by the same process.

The predetermined time period can range from one second to ten seconds. Furthermore, the predetermined time period can be changed by the user. More specifically, the user can set time less than one second or longer than ten seconds as the predetermined time period. Information about the predetermined time is recorded on the memory 102. Accordingly, the present exemplary embodiment can read the moving image data to be encrypted in addition to the embedding data, and encrypt the read moving image data together with the embedding data according to the information about the predetermined time.

In the present exemplary embodiment, the embedding data is embedded in the moving image data before being encrypted. Furthermore, the encryption is executed on the moving image data including the embedding data. However, the present invention is not limited to this. The embedding data can be embedded in the moving image data at the following timing. Specifically, at first, the embedding data to be embedded to the moving image data for the lost frame is encrypted according to the selected method for encoding the moving image data. Then, the encrypted embedding data can be embedded in the moving image data.

The configuration of and the operation by the image capture apparatus according to the present exemplary embodiment similar to the configuration of and the operation by the image capture apparatus according to the first exemplary embodiment can implement the effect similar to the effect of the first exemplary embodiment.

Exemplary moving image recording in-process still image capture process executed by the camera 100 according to a third exemplary embodiment will be described in detail below with reference to FIGS. 4 and 5. In the present exemplary embodiment, units, components, and configurations similar to those of the first and the second exemplary embodiments described above will not be described in detail and different points from the first and the second exemplary embodiments only will be described in detail.

FIG. 4 illustrates a condition for the determination on the embedding data (whether to encrypt the embedding data) to be embedded in moving image data while still image data is captured while the moving image data is being captured by the camera 100 according to the present exemplary embodiment.

In the second exemplary embodiment, if still image data is captured during capturing of moving image data, the CPU 101 executes control for encrypting the embedding data to be embedded in the moving image data together with the still image data to be recorded according to the status of the encryption setting flag (ON/OFF).

On the other hand, in the present exemplary embodiment, if the encryption setting flag is set ON, whether to encrypt the embedding data to be embedded in the moving image data is automatically changed. Encryption toggling process, which is process for toggling whether to encrypt the embedding data to be embedded into the moving image data is executed in steps S501 and S502, which will be described in detail below with reference to the flow chart of FIG. 5.

Figure 5:
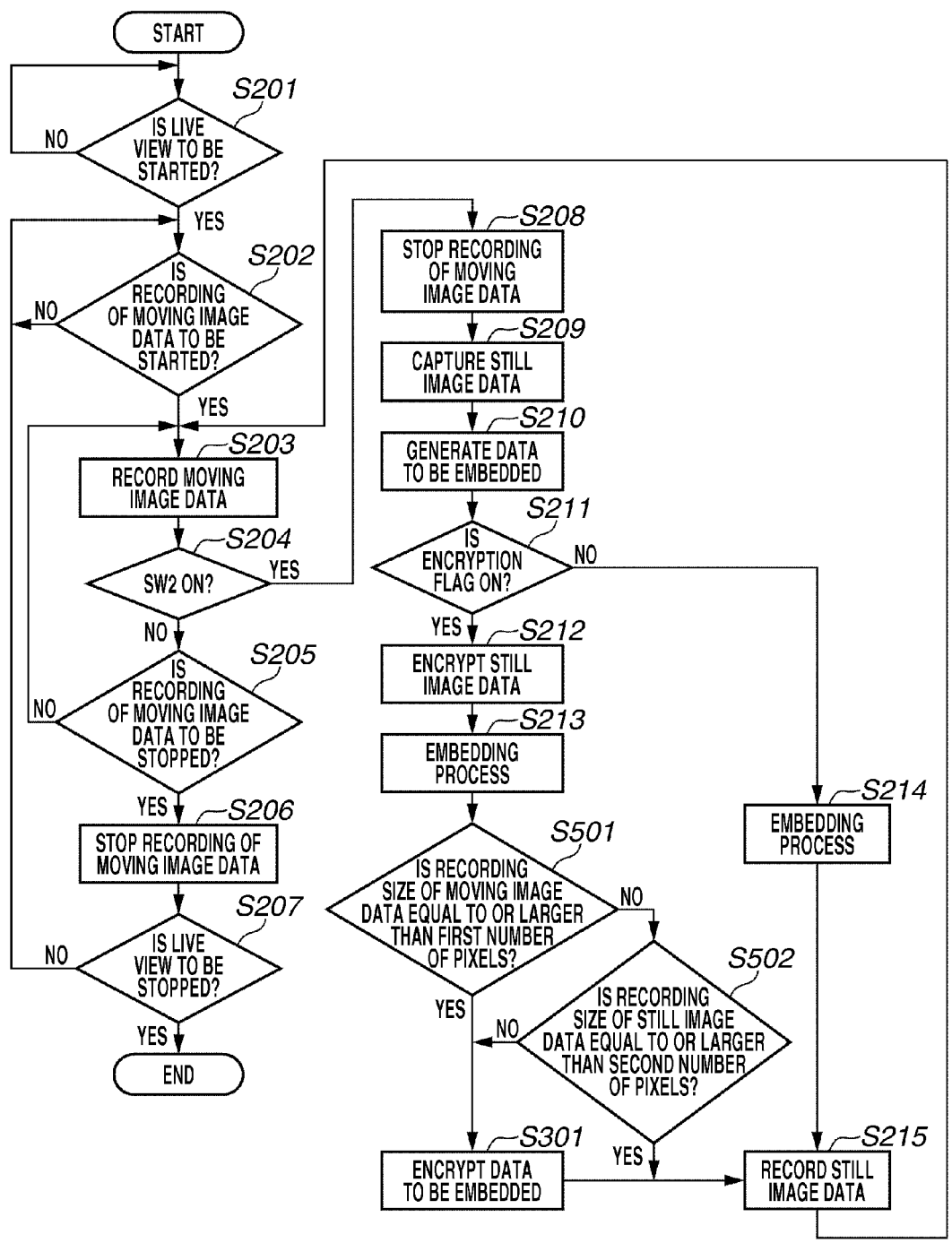
FIG. 5 is a flow chart illustrating an example of a moving image recording in-process still image capture process, which is executed by the image capture apparatus 100 according to the third exemplary embodiment of the present invention.

The moving image recording in-process still image capture process illustrated in FIG. 5 is executed if the camera 100 is in the image capture mode and the live view image capture and the video data encryption are set "ON" when the camera 100 has been powered on.

The camera 100 executes the process in the flow chart of FIG. 5 under control of the CPU 101 or an OS, which is operating on a computer (CPU or MPU), by executing a computer program read from the memory 102.

Referring to FIG. 5, in the present exemplary embodiment, after the CPU 101 has executed the embedding process for embedding the embedding data in the moving image data included in the moving image file in step S213, then the process proceeds from step S213 to step S501.

In step S501, the CPU 101 reads recording information from the moving image file recorded on the recording medium 103a. In addition, the CPU 101 determines whether the recording size of the moving image data is equal to or larger than a first number of pixels. In the present exemplary embodiment, the first number of pixels is one million pixels. If the recording size of the moving image data is full high definition (HD) or HD, the CPU 101 determines that the recording size of the moving image data is equal to or larger than one million pixels.

If it is determined that the recording size of the moving image data is equal to or larger than the first number of pixels (Yes in step S501), then the process proceeds from step S501 to step S301. In step S301, the embedding data that is embedded in the moving image data is encrypted.

If the recording size of the moving image data is video graphics array (VGA), the CPU 101 determines that the recording size of the moving image data is less than one million pixels. If it is determined that the recording size of the moving image data recorded on the recording medium 103a is less than the first number of pixels (No in step S501), then the process proceeds from step S501 to step S502.

More specifically, if the recording size of the moving image data recorded on the recording medium 103a is less than the first number of pixels (No in step S501), the security of the embedding data may be increased without encrypting the embedding data. Accordingly, it is necessary to determine the recording size of the still image data to omit the encryption on the embedding data.

In step S502, the CPU 101 reads the image capture information from the still image file recorded on the recording medium 103a. Furthermore, the CPU 101 determines whether the recording size of the still image data captured in step S209 is equal to or larger than a second number of pixels. In the present exemplary embodiment, the second number of pixels is 2.5 million pixels.

If the recording size of the still image data is L (10,000,000 pixels) or M (2,500,000 pixels), the CPU 101 determines that the recording size of the still image data is equal to or larger than 2.5 million pixels. On the other hand, if the recording size of the still image data is S (1,200,000 pixels), the CPU 101 determines that the recording size of the still image data is less than 2.5 million pixels.

If it is determined that the recording size is equal to or larger than the second number of pixels (Yes in step S502), then the process proceeds from step S502 to step S215.

If the recording size of the moving image data is less than the first number of pixels (No in step S501) and if the recording size of the still imaged is equal to or larger than the second number of pixels (Yes in step S502), then the CPU 101 does not execute the process in step S301. Accordingly, in this case, the embedding data that has been embedded into the moving image data is not encrypted.

If the recording size of the still image data is less than the second number of pixels (No in step S502), then the process proceeds from step S502 to step S301. If the recording size is less than the first number of pixels (No in step S501) and if the recording size of the still image data is less than the second number of pixels (No in step S502), then the CPU 101 executes the process in step S301. Accordingly, in this case, the embedding data that has been embedded into the moving image data is encrypted.

If the recording size of the moving image data is equal to or larger than the first number of pixels (Yes in step S501), regardless of the recording size of the still image data, the frame to be embedded in the moving image data may be extracted and utilized as still image data. Accordingly, the CPU 101 needs to execute control for encrypting the video data in step S212 and control for encrypting the embedding data in step S301.

Accordingly, in the present exemplary embodiment, if the recording size of the moving image data is equal to or larger than the first number of pixels, regardless of the recording size of the still image data, the CPU 101 executes control for encrypting the embedding data, which has been generated based on the still image data and which is to be embedded in the moving image data.

Accordingly, the security of the frame to be embedded in the moving image data when still image data is captured during capturing of the moving image data, can be enhanced.

Even if the recording size of the moving image data is less than the first number of pixels, if the recording size of the still image data is S (No in step S502), low-resolution still image data may have been intended to be used by the user because the resolution of the recording size of the still image data is low.

Therefore, if the recording size of the moving image data is VGA, it is necessary to encrypt the embedding data to be embedded in the moving image data to increase the security of the embedding data generated based on the still image data and to be embedded into the moving image data.

Accordingly, in the present exemplary embodiment, if the recording size of the moving image data is less than the first number of pixels but if the recording size of the still image data is less than the second number of pixels, the CPU 101 executes control for encrypting the embedding data.

With the above-described configuration, the present exemplary embodiment can enhance the security of the embedding data that has been generated based on still image data captured during capturing of moving image data.

If the recording size of the moving image data is less than the first number of pixels and if the recording size of the still image data is M or L (Yes in step S502), the security of the embedding data can be maintained without encryption because the resolution of the recording size of the moving image data is low.

Accordingly, in the present exemplary embodiment, if the recording size of the moving image data is less than the first number of pixels and if the recording size of the still image data is equal to or larger than the second number of pixels, then the CPU 101 executes control for not executing the encryption on the embedding data to be embedded in the moving image data in step S213. With the above-described configuration, the present exemplary embodiment can easily handle the moving image data including embedding data not to be encrypted.

As described above, the camera 100 according to the present exemplary embodiment automatically toggle between whether or not to encrypt the embedding data to be embedded in the moving image data according to the recording size of the still image data and the recording size of the moving image data. With the above-described configuration, the present exemplary embodiment can easily set the high security to the embedding data to be embedded in the moving image data according to the purpose of use of the data predicted according to the recording size of the captured moving image data, the recording size of the still image data, and the set resolution.

In the present exemplary embodiment, the condition for automatically toggling whether or not to encrypt the embedding data is not limited to the condition illustrated in FIG. 4.

In the present exemplary embodiment, the embedding data is embedded in the moving image data before being encrypted. Furthermore, the encryption is executed on the moving image data including the embedding data. However, the present invention is not limited to this. The portion of the moving image data for a predetermined time period before embedding the embedding data, can be encrypted together with the embedding data.

The portion of the moving image data for a predetermined time period after embedding the embedding data, can be encrypted together with the embedding data. Alternatively, the portion of the moving image data for a predetermined time period before embedding the embedding data and the portion of the moving image data for a predetermined time period after embedding the embedding data, can be encrypted together with the embedding data by the same process.

The predetermined time can range from one second to ten seconds. Furthermore, the predetermined time can be changed by the user. More specifically, the user can set time less than one second or longer than ten seconds as the predetermined time period. Information about the predetermined time is recorded on the memory 102. Accordingly, the present exemplary embodiment can read the moving image data to be encrypted in addition to the embedding data and encrypt the read moving image data together with the embedding data according to the information about the predetermined time period.

In the present exemplary embodiment, the first number of pixels is one million pixels and the second number of pixels is 2.5 million pixels. However, the recording sizes of the moving image data and the still image data used for toggling whether or not to encrypt the embedding data are not limited to the above-described numbers of pixels. In other words, the recording sizes of the moving image data and the still image data used for toggling whether or not to encrypt the embedding data can be arbitrarily set by the user. The configuration of and the operation by the image capture apparatus according to the present exemplary embodiment similar to the configuration of and the operation by the image capture apparatus according to the first and the second exemplary embodiments can implement the effect similar to the effect of the first and the second exemplary embodiments.

The image capture apparatus according to the present invention is not limited to the image capture apparatus 100 described above in the first through the third exemplary embodiments. More specifically, the present invention can also be implemented by a system including a plurality of apparatuses.

The process for implementing the functions of the first through the third exemplary embodiments of the present invention can be implemented by using a computer program. In this case, the computer program is read and executed by a computer from a computer-readable recording medium. The above-described computer program can be supplied to an apparatus or a system via a communication interface or a network, and can be executed by the apparatus or a computer included in the system.

For the computer-readable recording medium, an HDD, an optical disc, a CD-ROM, a CD-recordable (CD-R), a memory card, or a read-only memory (ROM) can be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-162099 filed Jul. 16, 2010, which is hereby incorporated by reference herein in its entirety.

What is claimed is:

1. An image capture apparatus comprising:
an image capture unit that captures a moving image and generates moving image data corresponding to a captured moving image;
an instruction unit that instructs the image capture unit to capture a still image;
an encryption unit that encrypts image data;
a control unit that (a) controls the image capture unit to stop capturing a moving image if an instruction for capturing a still image is inputted while a moving image is captured, (b) controls the image capture unit to capture a still image after the instruction is inputted while a moving image is captured, (c) executes a first process of generating, based on still image data corresponding to a captured still image, predetermined moving image data, (d) controls the encryption unit to encrypt, based on a first encryption method, the still image data after the instruction is inputted while a moving image is captured, (e) executes a second process of determining whether the encryption unit needs to encrypt, based on a second encryption method, the predetermined moving image data after the instruction is inputted while a moving image is captured, and (f) controls, based on a result of the second process, an execution of an encryption for the predetermined moving image data, wherein the predetermined moving image data is related to a period where capturing a moving image is stopped.

2. The image capture apparatus according to claim 1, further comprising a recording unit that stores a still image file and a moving image file in a recording medium separately,
wherein the still image file includes the still image data encrypted based on the first encryption method, and the moving image file includes the predetermined moving image data encrypted based on the second encryption method.

3. The image capture apparatus according to claim 1, wherein the second process includes a process for determining whether a recording size of moving image data, which is generated before the still image data is generated, is equal to or more than a first value.

4. The image capture apparatus according to claim 3, wherein the control unit controls the encryption unit to encrypt, based on the second encryption method, the predetermined moving image data if the recording size is equal to or more than the first value.

5. The image capture apparatus according to claim 1, wherein the second process includes a process for determining whether a recording size of the still image data is equal to or more than a second value.

6. A non-transitory computer-readable recording medium storing a program to be executed by a computer, wherein the program causes the computer to perform a method, the method comprising:
capturing a moving image;
generating moving image data corresponding to a captured moving image;
stopping capture of a moving image if an instruction for capturing a still image is inputted while a moving image is captured;
capturing a still image after the instruction is inputted while a moving image is captured;
executing a first process of generating, based on still image data corresponding to a captured still image, predetermined moving image data, wherein the predetermined moving image data is related to a period where capturing a moving image is stopped;
encrypting, based on a first encryption method, the still image data after the instruction is inputted while a moving image is captured;
executing a second process of determining whether to encrypt, based on a second encryption method, the predetermined moving image data after the instruction is inputted while a moving image is captured; and
controlling, based on a result of the second process, an execution of an encryption for the predetermined moving image data.

7. The non-transitory computer-readable recording medium according to claim 6, the method further comprising storing a still image file and a moving image file in a recording medium separately, wherein the still image file includes the still image data encrypted based on the first encryption method, and
the moving image file includes the predetermined moving image data encrypted based on the second encryption method.

8. A control method comprising:
capturing a moving image;
generating moving image data corresponding to a captured moving image;
stopping capturing a moving image if an instruction for capturing a still image is inputted while a moving image is captured;
capturing a still image after the instruction is inputted while a moving image is captured;
executing a first process of generating, based on still image data corresponding to a captured still image, predetermined moving image data, wherein the predetermined moving image data is related to a period where capturing a moving image is stopped;
encrypting, based on a first encryption method, the still image data after the instruction is inputted while a moving image is captured;
executing a second process of determining whether to encrypt, based on a second encryption method, the predetermined moving image data after the instruction is inputted while a moving image is captured; and
controlling, based on a result of the second process, an execution of an encryption for the predetermined moving image data.

9. The method according to claim 8, wherein the second process includes a process for determining whether a recording size of moving image data, which is generated before the still image data is generated, is equal to or more than a first value.

10. The method according to claim 9, further comprising encrypting, based on the second encryption method, the predetermined moving image data if the recording size is equal to or more than the first value.

11. The method according to claim 8, wherein the second process includes a process for determining whether a recording size of the still image data is equal to or more than a second value.

12. The method according to claim 8, the method further comprising
storing a still image file and a moving image file in a recording medium separately, wherein the still image file includes the still image data encrypted based on the first encryption method, and the moving image file includes the predetermined moving image data encrypted based on the second encryption method.

* * * * *